(12) United States Patent
Shia

(10) Patent No.: US 7,512,531 B1
(45) Date of Patent: Mar. 31, 2009

(54) METHOD AND APPARATUS FOR SPECIFYING REACTIVE SYSTEMS

(76) Inventor: Daniel Shia, 765 Market St., #26A, San Francisco, CA (US) 94103

( * ) Notice: Subject to any disclaimer, the term of this patent is extended or adjusted under 35 U.S.C. 154(b) by 1448 days.

(21) Appl. No.: 10/427,409

(22) Filed: Apr. 30, 2003

Related U.S. Application Data

(60) Provisional application No. 60/437,457, filed on Dec. 30, 2002.

(51) Int. Cl.
*G06F 17/50* (2006.01)
(52) U.S. Cl. ............................. 703/16; 703/17; 703/15; 703/2; 326/46
(58) Field of Classification Search .................... 703/2, 703/17; 326/46
See application file for complete search history.

(56) References Cited

U.S. PATENT DOCUMENTS

2002/0161907 A1* 10/2002 Moon ........................ 709/230

2006/0085172 A1* 4/2006 Wilson ........................ 703/2

OTHER PUBLICATIONS

UML Tutorial: Finite State Machines, Robert C. Martin, Engineerin Notebook Column, Jun. 98.*
"United Modeling Language Version 1.3," Jun. 1999, 29 pages.

* cited by examiner

*Primary Examiner*—Vibol Tan
(74) *Attorney, Agent, or Firm*—Townsend and Townsend and Crew LLP

(57) ABSTRACT

A method for specifying reactive systems using Dynamic State Machines (DSMs) is disclosed. The method extends statecharts in three areas. One is the integration of a group of related finite state machines (FSMs) into a single and powerful entity supporting multiple repeatable concurrent communication sessions. The second is the support for composite transitions to model various parallel event patterns or nested event patterns, which occur in the real world, and to significantly improve the readability of state diagrams. The third is the addition of a parallel-OR composite state to support the OR-termination semantics of a parallel composite state.

19 Claims, 11 Drawing Sheets

METHOD AND APPARATUS FOR SPECIFYING REACTIVE SYSTEMS

CROSS-REFERENCES TO RELATED APPLICATION(S)

The present application claims the benefit of priority under 35 U.S.C. § 119 from U.S. Provisional Patent Application Ser. No. 60/437,457, entitled "METHOD FOR SPECIFYING REACTIVE SYSTEMS USING DYNAMIC STATE MACHINES", filed on Dec. 30, 2002, the disclosure of which is hereby incorporated by reference in its entirety for all purposes.

BACKGROUND OF THE INVENTION

The present invention generally relates to finite state machines (FSMs), hierarchical finite state machines, and, in particular, to a method for specifying the behavior of a reactive entity or system.

A pure FSM includes a number of states and their outgoing transitions specified in a state diagram. When a state is inactive, all its (outgoing) transitions are disabled. When a state is active, all its (outgoing) transitions are enabled. Upon receiving an enabled valid event for a particular active state, a transition is triggered and an associated action is performed along with the transition. A transition may or may not change state. If a transition changes state, it makes the current state inactive, and makes another state active. If a transition can change to one of several possible states, which particular state to change to must be determined at run-time so that run-time deterministic behavior can be ensured. It should be understood that there are several variations of FSM semantics in existence. For the purposes of simplicity and clarity, the foregoing definition of FSM is adopted merely for illustration herein. However, this choice of definition of FSM should not be considered as restrictive.

Pure FSM has a number of disadvantages. For example, one undesirable restriction is that a pure FSM has no memory. Due to its lack of memory, the usage of a pure FSM is very limited. Since a state in a pure FSM contains no memory, any change or information about history, such as a simple counter, must be presented by defining additional states in order to maintain these changes. Given the infinite number of values that a counter may have, an infinite number of states would be required.

Extended finite state machines (EFSMs) or Register Automata add memory or data variables to each state to contain values, such as numbers and counters, to overcome the major problem of a pure FSM as described above. EFSMs are widely used to model various reactive systems.

When EFSMs are used to model some real world events or behavior, it is often found that a hierarchical of states or nested states are useful to reduce the number of states and to organize a complex set of states into a hierarchy. Statechart as part of the United Modeling Language (UML) and STATEMATE are some examples. See Bruce Powel Douglass, Doing Hard Time, Addison-Wesley, 1999. See also D. Harel et al., STATEMATE: A Working Environment for the Development of Complex Reactive Systems, IEEE Transactions on Software Engineering, Vol. 16, April 1990. Statechart is the term used herein to refer to a hierarchical finite state machine.

The benefits of statecharts are twofold. One is that the super-state provides a structuring mechanism to support layered abstraction of states. Layered abstraction is useful in specifying a complex system. It supports a stepwise refinement approach. In addition, with various layers, the system can be viewed at a different level of granularity at each layer. The other benefit is that by sharing some commonly used component states, the number of states can be greatly reduced.

Statechart supports two kinds of super-states. One kind of super-state is called OR-state. An OR-state can be decomposed into multiple sequential sub-states. An OR-state is alternatively called a "Sequential Composite State" as further described herein. The other kind of super-state is called AND-state. An AND-state can be decomposed into multiple parallel, orthogonal or concurrent sub-states (or regions as referred to by UML). An AND-state is alternatively called a "Parallel-AND Composite State" as further described herein.

However, to model many complex real world events and activities, these two kinds of super-states are not sufficient. One deficiency is that a statechart does not support "Parallel-OR Composite States" as further described herein.

A more significant deficiency is that a statechart does not support "Composite Transitions". FSM traditionally supports only the concept of simple transitions. With a simple transition, one enabled event is sufficient to drive a state transition, namely moving from one state to another. However, in the real world, sometimes an object or an entity waits for several possible events, and only a certain logical combination of these events would trigger a state transition. The statechart attempts to solve this problem by forking and joining transitions and adding additional synchronization pseudo-states. However, the result of that approach is like spaghetti of transitions, and the spaghetti-like state diagram makes it very difficult to read and understand the meaning of a specification. From another perspective, reading a statechart with fork, join and pseudo-states is like reading a software code with many "goto" statements. A more elegant and structured way is needed.

Another significant deficiency is that a statechart does not support creating and destroying child FSMs dynamically or at run time. A traditional FSM is a sequential machine. It stays in one state and only handles those enabled events for that particular state. Events that are not considered valid for that particular state are ignored. For example, when a server object opens a customer record, and starts a session of editing (the editing session may have several states and each state can handle certain editing commands), while the server object is in the middle of editing one record, it typically cannot handle another record open request. This is because the server object would be in a state which can only accept a particular set of editing requests. However, in a highly sophisticated distributed computing environment, it is desirable that multiple sessions can be handled at the same time by a single server entity. It is also possible that each of these sessions may have child sessions, and a child session may have its own child sessions, hence, forming a tree of sessions at run time. Since how many sessions and child sessions are outstanding depend on what requests are received at run time, the number of states cannot be fixed at design time. Since a statechart only supports a static number of states, it cannot describe the behavior of such a dynamic server.

Traditionally, protocols between two interacting entities are defined in a FSM. However, since the number of states of a FSM is statically fixed at design time, FSM cannot be used to define complex protocols supporting a tree of communication sessions. For example, a customer talks to a support staff to place a new order (#2). While he is in the middle of placing the new order, the customer realizes that he needs to refer to another previously placed order (#1). So, the customer requests the support staff to dig into order #1 while temporarily putting the current order #2 on hold. After the customer is done with order #1, he continues with order #2. The customer may even want to open a third order before closing order #1 and #2. This kind of protocol supporting multiple concurrent sessions requires the support for a tree of sessions with each session defined as a FSM. This kind of protocol, however, cannot be defined as a single FSM due to its static nature.

Hence, it would be desirable to provide a method that is capable of extending and improving statecharts in order to accommodate the increasingly complex processing needs of reactive systems.

BRIEF SUMMARY OF THE INVENTION

A method to extend statecharts is provided. According to an exemplary embodiment, the method describes a dynamic state machine with several extensions to statechart and its related technologies. In one exemplary implementation, the method is incorporated in a graphical user interface (GUI) based specification tool. For purposes of definition and illustration herein, a traditional FSM is differentiated from a FSM that has been improved with extensions provided by the exemplary method of the present invention, as further described below. More specifically, the traditional hierarchical FSM is referred as "statechart", and the improved FSM is referred to as "FSM". "DSM" is used to refer to a tree of related FSMs.

According to the exemplary method, a root FSM and its nested child FSMs are fully integrated into a single entity. The single entity includes a Dynamic State Machine (DSM). One benefit of this is that a single entity with a DSM behavior specification can handle multiple repeated requests for sessions and child-sessions (or sub-sessions) at run time. Therefore, it reduces the number of entities and protocols among them and their specifications. Another benefit is that nearly all real world entities, even as complex as human behavior, can be described in DSMs. A business application therefore can be modeled or implemented by directly mapping activities of each worker in an organization into a DSM. In other words, DSM provides a simple and straightforward direct mapping from the real world to software or hardware systems. With this direct mapping, non-technical users can easily understand the system, while engineers can easily maintain the system.

In addition to simple transitions, the exemplary method supports composite transitions ("Composite Transitions"). A Composite Transition can be decomposed into a number of sub-transitions. Each of these sub-transitions can be either simple or composite. These sub-transitions are related to each other in three different ways. One is the "Parallel-AND" relationship. A Composite Transition with Parallel-AND sub-transitions is called a "Parallel-AND Composite Transition" and it is completed only when all its sub-transitions are completed. The second relationship is "Parallel-OR". A Composite Transition with Parallel-OR sub-transitions is called a "Parallel-OR Composite Transition" and it is completed if any of its sub-transitions is completed.

The third relationship is "Sequential". A Composite Transition with sequential sub-transitions is called a Sequential Composite Transition. A Sequential Composite Transition is decomposed into multiple sub-states and sub-transitions similar to an OR-state of a statechart (referred to as Sequential Composite State herein). A Sequential Composite Transition is completed only when its equivalent Sequential Composite State (or the OR-state) has terminated.

These Composite Transitions can be combined to form a nested transition. For example, a Composite Transition may be decomposed into two Parallel-AND sub-transitions T1 and T2. Parallel-AND sub-transition T1 is further decomposed into two Parallel-OR sub-transitions T1.1 and T1.2. Likewise, Parallel-AND sub-transition T2 is further decomposed into Sequential sub-transitions with one sub-state and two sub-transitions T2.1 and T2.2.

One benefit of the present invention is that various event patterns or nested event patterns which occur in the real world now can be modeled by Composite Transitions to trigger a high level state transition.

Another benefit is that the convolution of transitions created by forking and joining transitions, and adding extra synchronization pseudo-states used by statecharts are replaced with highly structured layered states and transitions. Now layered abstraction can be applied to both states and transitions. The readability of a state diagram is dramatically improved.

In addition to Parallel-AND Composite State, the exemplary method supports Parallel-OR Composite States. A Parallel-OR Composite State is differentiated from a Parallel-AND Composite State based on how a Composite State terminates. An instance of the pre-defined event type "completed" occurs when a Composite State terminates. For a Parallel-AND Composite State, this event instance occurs when all sub-states of the Parallel-AND Composite State have terminated. For a Parallel-OR Composite State, this event instance occurs when any one of the sub-states of the Parallel-OR Composite State has terminated.

The benefit of this additional Parallel-OR Composite State is that the OR-ending termination semantics of a Parallel Composite State is supported for solving a broader range of problems in the real world.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments will now be described. In the following description, numerous specific details are set forth in detail to provide a more thorough description of the invention. It will be apparent to one skilled in the art, however, that this invention can be practiced without these specific details. In other instances, well known features have not been described in detail so as not to unnecessarily obscure the invention.

In one exemplary embodiment, a method for defining a dynamic state machine (DSM) using several extended features is described.

Figure 1:
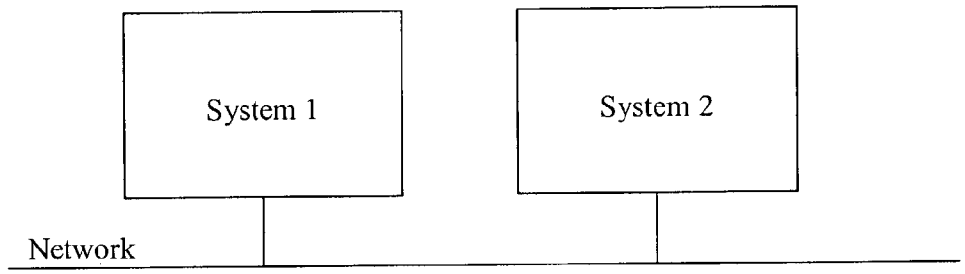
FIG. 1 is a simplified block diagram showing an example of a distributed computing environment.

Like a statechart, a DSM is a general requirement and design method, which can be used to specify a wide range of software or hardware systems. With its support of a set of concurrent FSMs, it is particularly useful for defining systems in a real time or distributed environment as in FIG. 1.

Figure 2:
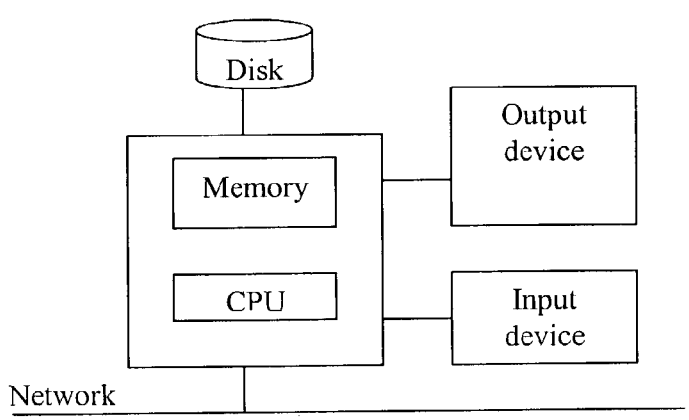
FIG. 2 is a simplified block diagram illustrating a computer system that can be used to implement the present invention.

A distributed environment typically is made up of multiple nodes connected by a network. Each node has a hardware system that includes a central processing unit (CPU), memory (ROM, RAM, and disks), and input and output devices as in FIG. 2.

The hardware system is a computer, which may be a Personal Data Assistant (PDA), a laptop, a desktop, a workstation, a real time control device, a networked equipment, or any of a variety of other devices providing computing and input/output capabilities.

Figure 3:
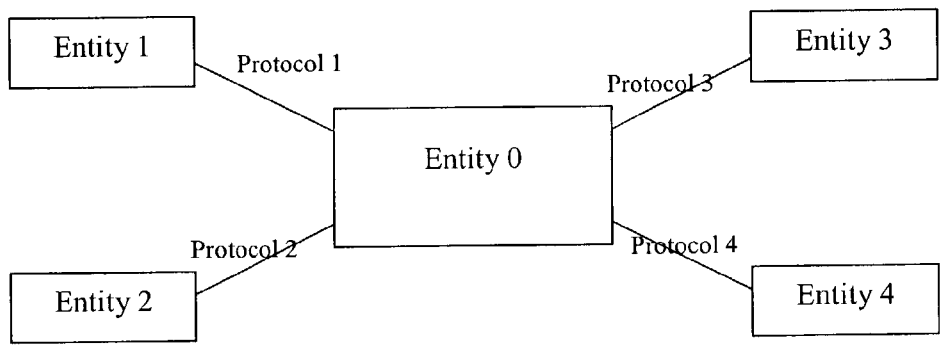
FIG. 3 is a simplified block diagram illustrating a conceptual computation model based on the usage of DSMs.

Both the behavior of a reactive entity and the protocol in between two communicating entities can be specified by DSMs. FIG. 3 depicts a conceptual computation model based on the usage of DSMs. In FIG. 3, the behavior of entities #0, #1, #2, #3, and #4 and protocols #1, #2, #3 and #4 can be specified in DSMs. A DSM specifying an entity behavior is called an "Entity DSM". A DSM specifying a protocol is called a "Protocol DSM".

An Entity DSM defines the valid sequence of incoming events the entity needs to handle and the associated state transitions, whereas a Protocol DSM defines the valid sequence of messages that can be sent and received by both communicating entities.

In order to define a DSM, a graphical user interface (GUI) based diagramming tool (referred to as the "GUI Tool") is usually preferred. The GUI Tool can be implemented in a computer system such as the system depicted in FIG. 2.

All of the steps in the method described below can be followed by a designer using the GUI Tool. The output of this process is a set of DSM specifications. Such specifications can be stored in a storage device. These DSM specifications can be used later to build application systems. The GUI Tool itself is typically a software system implemented by programmers, and runs on a hardware system or nodes such as that depicted in FIG. 2. Given the following detailed description of the method of the present invention, a person of ordinary skill in the art will appreciate the various ways and/or methods that can be used to produce code to implement such a GUI Tool supporting DSM specifications.

As mentioned above, a prior art statechart, has three areas of deficiencies. One is the lack of support for grouping of multiple related FSMs into a single entity. The second deficiency is the lack of support for Composite Transitions. The third deficiency is the lack of support for a Parallel-OR Composite State.

The following scenario demonstrates the first limitation of the prior art statechart, and how the present invention can be applied to overcome this limitation.

Figure 4:
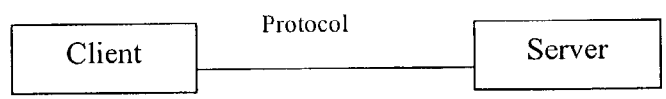
FIG. 4 is a simplified block diagram showing a client interacting with a server.
Figure 5:
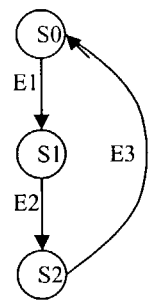
FIG. 5 is a simplified illustrative diagram showing a FSM specification of a server.

FIG. 4 shows a client interacting with a server. FIG. 5 depicts the FSM specification of the server. While the server is at state S0, it waits for the client to send it an event E1. When event E1 occurs, the server moves to state S1 and waits for event E2. When event E2 occurs, the server moves to state S2 and waits for event E3. When event E3 occurs, the server moves back to state S0 and waits for event E1. Notice that, according to this FSM specification, while the server is at state S1, the only enabled event is event E2. If another event E1 occurs while the server is at state S1, event E1 would not be handled properly. If the client sends event E1 repeatedly, the server would not handle each event E1 correctly.

Figure 6:
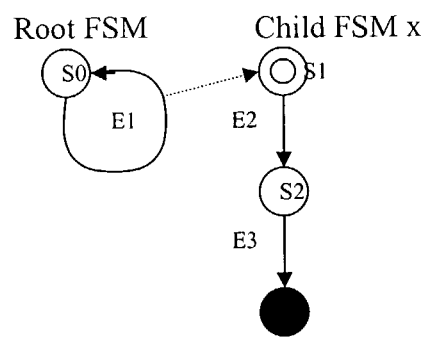
FIG. 6 is a simplified illustrative diagram showing a DSM specification of a server with its child FSMs in accordance with an exemplary method of the present invention.

FIG. 6 depicts an exemplary DSM specification that can be used to overcome this limitation of the prior art statechart. The DSM allows the Root FSM of the server to dynamically create a child FSM upon receiving each event E1. While the child FSM waits for event E2, the Root FSM remains at state S0 waiting for the next event E1. Double circle indicates that it is an initial state, and a solid circle indicates that it is a final state. While at state S0, when event E1 is received, a child FSM is created and state S0 in the Root FSM remains active. When the child FSM is created, the initial state S1 becomes active. When event E2 is received, the child FSM changes state, i.e., state S1 becomes inactive and state S2 becomes active. When event E3 is received, the child FSM changes state again, i.e., state S2 becomes inactive and the final state S3 becomes active. In this instance, reaching the final state S3 indicates that the child FSM terminates.

With DSM, any transition triggered by a valid incoming event can create zero or more child FSMs depending on the need of an application. This transition may result in a change from one state to another, or the transition may not result in any change of state at all. The created child FSM has its own identifier and runs in parallel with its parent, the Root FSM. If the child FSM has a final state defined, when this final state becomes active, the child FSM terminates.

Figure 7:
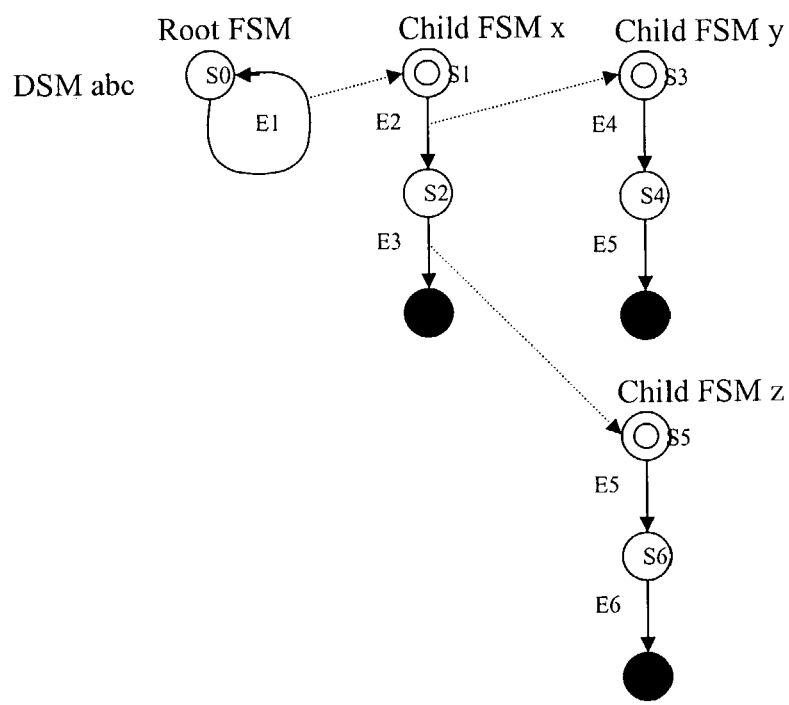
FIG. 7 is a simplified illustrative diagram showing a DSM specification of nested FSMs in accordance with an exemplary method of the present invention.

A child FSM can also create its own child FSMs at run time, thus, forming nested FSMs. FIG. 7 depicts an exemplary DSM with nested FSMs. Therefore, a DSM may be made up of a tree of FSMs. This tree can grow and shrink depending on the load at run time.

With DSM, there can be multiple FSMs running at the same time. Therefore, a DSM may have many states active at the same time, hence, enhancing its capability to handle lots of events concurrently. Theoretically, there is no limit to how many outstanding child FSMs a DSM can have at run time.

In general, if the effect of an event, such as event E1 in FIG. 5 and FIG. 6, is to open a new session for a sequence of events to be exchanged subsequently and there can potentially be repeated requests that may result in multiple sessions being opened concurrently, one child FSM should be created upon receiving each of these events. Since sessions can be nested, i.e., a session can contain several child sessions each of which in turn can contain its own child sessions, a tree of sessions is typically formed at run time. Such tree of sessions is represented by a DSM with a tree of FSMs.

Note that defining a DSM with child FSMs is different from having one entity supporting the Root FSM, while dynamically creating other entities to support child FSMs. The difference is that a DSM supporting both the Root FSM and all of its child FSMs is treated as one single entity typically with a single identifier, and it is this single entity that is interacting with other entities.

Figure 8:
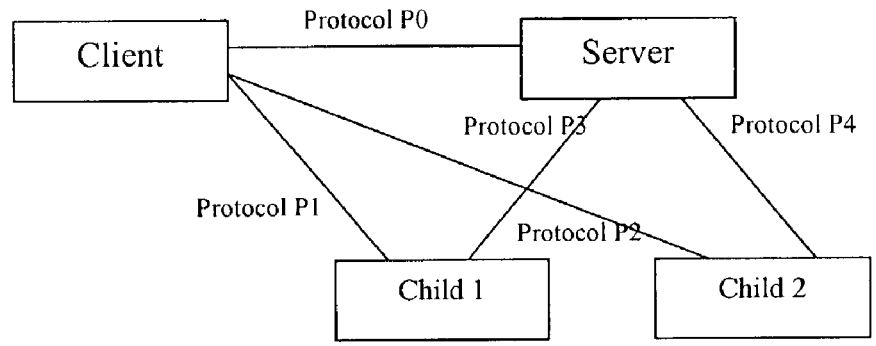
FIG. 8 is a simplified block diagram showing a client interacting with a server and its child entities.

FIG. 8 depicts that with a statechart, the client would need to interact with the parent entity (Server) following one protocol (P0) and then interact with various child entities (such as Child 1 and Child 2) following their respective sets of protocol (such as P1 and P2). One problem associated with this statechart approach is that the parent entity typically needs to collect results from each child entity and/or even interact or coordinate with each child entity in order to perform a desirable function correctly. Therefore, with multiple entities in existence, there is an additional burden of communicating and coordinating between the parent and its various child entities. These additional communications would require yet additional sets of protocol (such as P3 and P4) which need to be defined. Since for each repeated event E1 in the above example, a new child entity is created, under heavy load conditions, there can be a large number of child entities running at the same time.

The overhead of the foregoing statechart application is as follows. For each pair of client entity and server entity interacting with each other, if there are N event types, such as event E1 in FIG. 5 and FIG. 6, that are capable of opening new sessions, 2 times N (or 2×N) protocols would be needed. If there are M session instances opened at run time, there would be M child entities running at run time. If an application has one client and P servers, there can be P times 2N (or 2×N×P) protocols specified and P times M (or P×M) entities running. Some real world applications may see an explosion of the number of protocols and entities required. The complexity of managing and synchronizing all of these communications among various entities can be overwhelming.

In contrast, the exemplary method of the present invention does not require adding extra protocols and entities. The exemplary method keeps the number of entities to a minimum by allowing an entity to support a tree of FSMs. Using the example above, 2×N×P protocols would be reduced to P protocols, and P×M entities would be reduced to P entities. The effect of the DSM is that the server is now capable of handling an infinite number of repeated event E1's in parallel with other events, such as events E2 and E3, while keeping the design fairly simple and easy to understand.

Another benefit of the present invention is that it keeps the communication overhead to the minimum. With a statechart, there can be a large number of entities which need to communicate with each other. Providing the communication capability for each of these entities in a distributed environment can be very expensive. With the present invention, the communications overhead can be dramatically reduced.

The following scenario demonstrates the second limitation of a statechart, and how the present invention can be applied to overcome this limitation.

With a statechart, one enabled event always triggers one transition or an action performed. This type of transition is called a "Simple Transition". However, in the real world, it may require a combination of various events to trigger a transition. A transition that requires more than one event to complete is called a "Composite Transition".

Figure 9:
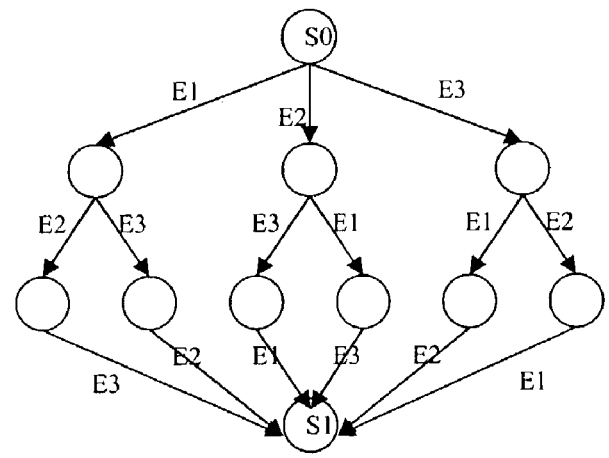
FIG. 9 is a simplified illustrative diagram showing a FSM specification with many intermediate states.

FIG. 9 illustrates a FSM specification that provides for many intermediate states between two states (state S0 and S1). While in state S0, an entity may wait for the arrival of all the events E1, E2 and E3 before changing to state S1. In this instance, the sequence of occurrence of these events is not significant. Consequently, many intermediate states are provided in the FSM specification.

In addition to Simple Transitions, an exemplary method of the present invention supports Composite Transitions. A Composite Transition can be decomposed into a number of sub-transitions. Each sub-transition can be further decomposed to its own sub-transitions recursively until each sub-transition cannot be further decomposed. A transition that cannot be decomposed into sub-transitions is a Simple Transition. Hence, a Composite Transition can be viewed as a tree of sub-transitions, where each terminal node represents a Simple Transition.

In an exemplary method of the present invention, these sub-transitions are related to each other in three different ways. One is the "Parallel-AND" relationship. A Composite Transition with Parallel-AND sub-transitions is called a "Parallel-AND Composite Transition" and it is completed only when all its sub-transitions are completed. The second relationship is "Parallel-OR". A Composite Transition with Parallel-OR sub-transitions is called a "Parallel-OR Composite Transition" and it is completed if any of its sub-transitions is completed.

The third relationship is "Sequential". A Composite Transition with sequential sub-transitions is called a Sequential Composite Transition. A Sequential Composite Transition is decomposed into multiple sub-states and sub-transitions similar to an OR-state of a statechart (referred to as Sequential Composite State herein). A Sequential Composite Transition is completed only when its equivalent Sequential Composite State (or the OR-state) has terminated.

Figure 10:
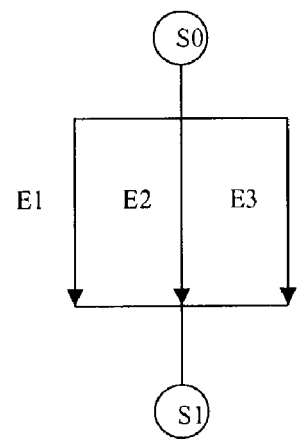
FIG. 10 is a simplified illustrative diagram showing a FSM specification with an expanded Parallel-AND Composite Transition in accordance with an exemplary method of the present invention.

According to one exemplary embodiment of the present invention, the example depicted in FIG. 9 can be simplified as depicted in FIG. 10. While state S0 is active, all its transitions and their sub-transitions are enabled, which means that sub-transition E1, E2, and E3 are all enabled. If event E1 is received, its corresponding sub-transition is completed, and E1 is disabled to prevent another E1 from triggering a duplicated transition. Later when E2 or E3 is received, its corresponding sub-transition is completed and disabled. When all of these sub-transitions are completed, the Composite Transition is completed. Hence, state S0 becomes inactive and state S1 becomes active.

Figure 11:
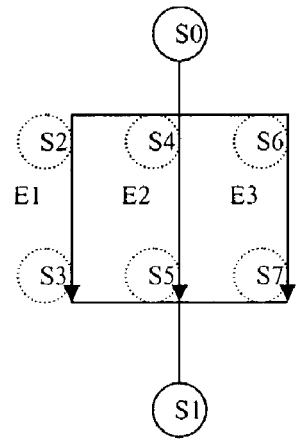
FIG. 11 is a simplified illustrative diagram showing a FSM specification with an expanded Parallel-AND Composite Transition with its pseudo states shown in accordance with an exemplary method of the present invention.

To help understand the behavior of a Parallel-AND Composite Transition, a number of pseudo sub-states are added as dashed circles in FIG. 11. While state S0 is active, all its transitions and their sub-transitions are enabled, which means that pseudo sub-states S2, S4, and S6 are also active. If event E1 is received, its corresponding sub-transition is completed, meaning pseudo sub-state S2 becomes inactive and pseudo sub-state S3 becomes active. At this time, state S0 and pseudo sub-states S4, and S6 remain active. If event E3 is received, its corresponding sub-transition is completed, meaning pseudo sub-state S6 becomes inactive and pseudo sub-state S7 becomes active. At this time, state S0 and pseudo sub-states S3, and S4 remain active. If event E2 is received, its corresponding sub-transition is completed, meaning pseudo sub-state S4 becomes inactive and pseudo sub-state S5 becomes active. When all these sub-transitions are completed, the Composite Transition is completed. Hence, state S0 becomes inactive and state S1 becomes active.

Figure 12:
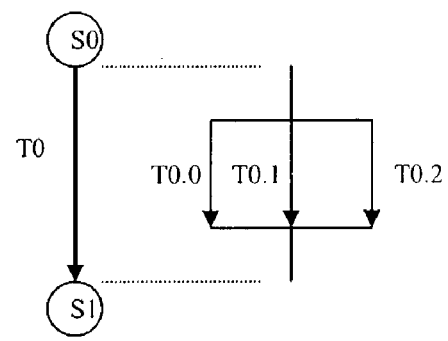
FIG. 12 is a simplified illustrative diagram showing a FSM specification with a Parallel-AND Composite Transition and its decomposition in accordance with an exemplary method of the present invention.

Conceptually, a Composite Transition is similar to a Simple Transition, which changes from one state to another. FIG. 12 illustrates a Parallel-AND Composite Transition. As shown in FIG. 12, the Composite Transition T0 results in a state change from state S0 to state S1. Composite Transition T0 is decomposed into three (3) sub-transitions T0.0, T0.1 and T0.2. Since this is a Parallel-AND Composite Transition, T0 is completed only if all its sub-transitions T0.0, T0.1 and T0.2 are completed.

Figure 13:
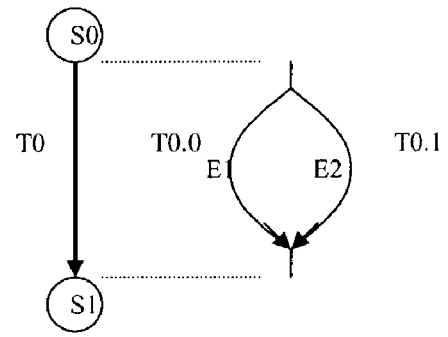
FIG. 13 is a simplified illustrative diagram showing a FSM specification with a Parallel-OR Composite Transition in accordance with an exemplary method of the present invention.

FIG. 13 illustrates a Parallel-OR Composite Transition. T0 is a "Parallel-OR" Composite Transition. As depicted in FIG. 13, while state S0 is active, an entity may wait for either one of the two sub-transitions T0.0 and T0.1 to complete before changing state from state S0 to state S1. While state S0 is active, all its transitions and their sub-transitions are enabled, which means that sub-transition E1 and E2 are all enabled. If either event E1 or E2 is received, its corresponding sub-transition is completed, and the event is disabled to prevent another occurrence of the same event from triggering a duplicated transition. When any one of these sub-transitions is completed, the Composite Transition is completed. Hence, state S0 becomes inactive and state S1 becomes active.

Figure 14:
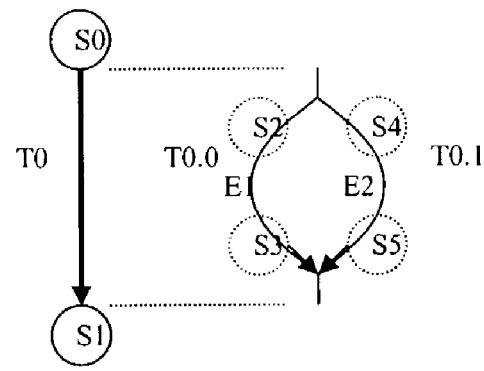
FIG. 14 is a simplified illustrative diagram showing a FSM specification with a Parallel-OR Composite Transition with its pseudo sub-states shown in accordance with an exemplary method of the present invention.

To help understand the behavior of the "Parallel-OR" Composite Transition, some pseudo sub-states are used in FIG. 14 to illustrate the explanation. While state S0 is active, all its transitions and their sub-transitions are enabled. Hence, in addition to state S0, pseudo sub-states S2 and S4 are also active. If an event E1 is received, its corresponding sub-transition T0.0 is completed, meaning pseudo sub-state S2 becomes inactive and pseudo sub-state S3 becomes active. Since a Parallel-OR Composite Transition is completed when any of its sub-transitions is completed, state S0 becomes inactive and state S1 becomes active.

Figure 15:
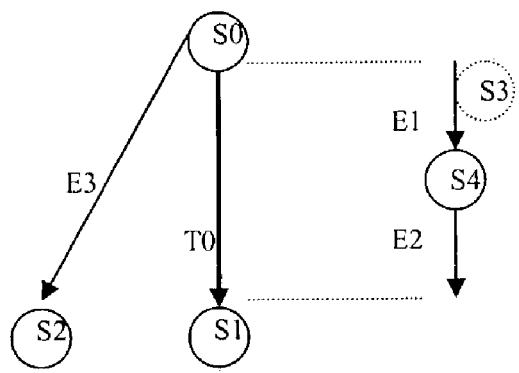
FIG. 15 is a simplified illustrative diagram showing a FSM specification with a Sequential Composite Transition in accordance with an exemplary method of the present invention.

FIG. 15 illustrates a Sequential Composite Transition. T0 is a Sequential Composite Transition. As depicted in FIG. 15, while state S0 is active, an entity may wait for event E1 then event E2 in order to change state from state S0 to state S1; or the entity may wait for event E3 in order to change state from state S0 to state S2. To help understand the behavior of a Sequential Composite Transition, some pseudo sub-states are used to illustrate the explanation. While state S0 is active, all its transitions and their sub-transitions are enabled. Hence, in addition to state S0, pseudo sub-state S3 is also active. If an event E1 is received, pseudo sub-state S3 becomes inactive and pseudo sub-state S4 becomes active. At this time, if an event E2 is received, pseudo sub-state S4 becomes inactive and state S1 becomes active. However, if an event E3 is received while pseudo sub-state S4 is active, state S0 becomes inactive and state S2 becomes active. When state S0 becomes inactive, all its transitions and sub-transitions are disabled. Any active pseudo sub-states, such as pseudo sub-state S4, also become inactive.

Figure 16:
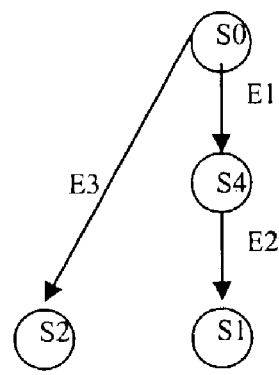
FIG. 16 is a simplified illustrative diagram showing a FSM specification without a Sequential Composite Transition.

The behavior of FIG. 15 is different from a statechart example as depicted in FIG. 16. In FIG. 16, after receiving event E1, state S0 becomes inactive and state S4 becomes active. If event E3 is received at this time, event E3 would be treated as an invalid event, since event E3 is not enabled. Note that unlike sub-state S4 in FIG. 15, which is a sub-state at the same level as pseudo sub-state S3 in FIG. 15, state S4 in FIG. 16 is a sibling state of state S0, i.e., state S0 and state S4 in FIG. 16 are at the same level; hence, state S0 and state S4 are mutually exclusive in that they cannot be active at the same time.

Figure 17:
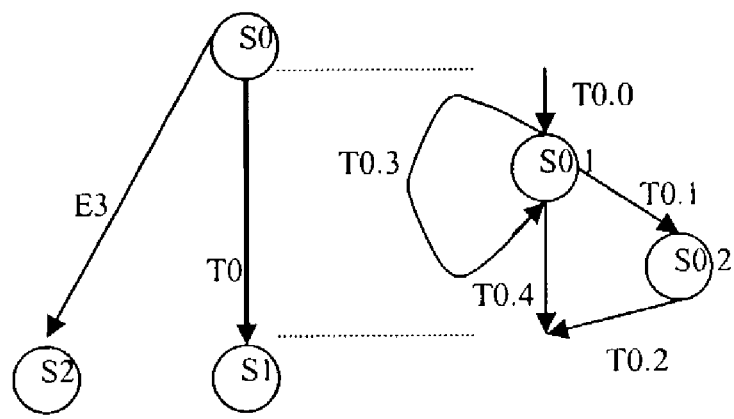
FIG. 17 is a simplified illustrative diagram showing a FSM specification with a Sequential Composite Transition, which is decomposed into a sub-FSM, in accordance with an exemplary method of the present invention.

A Sequential Composite Transition can be decomposed into any complex sub-FSM as long as the sub-FSM has at least one terminating transition. FIG. 17 depicts an exemplary Sequential Composite Transition T0, which is decomposed into a sub-FSM with two sequential sub-states and two terminating transitions as shown on the right.

When the source state S0 of the composite transition becomes active, all sub-transitions (T0.0 in this example)

leading from the source state S0 of the composite transition become enabled. Each sub-transition may have a source sub-state and a target sub-state. Upon receiving an event associated with one of the enabled sub-transitions, the corresponding sub-transition (T0.0 in this example) is completed and the target sub-state (S0.1 in this example) of the corresponding sub-transition becomes active. When one of the sub-states, such as S0.1, becomes active, all its associated sub-transitions, such as T0.1, T0.3 and T0.4, are enabled. If the sub-transition has a source sub-state, the source sub-state becomes inactive when its associated sub-transition is completed. For example, sub-transition T0.1 has a source sub-state S0.1 and a target sub-state S0.2. When sub-transition T0.1 is completed, the source sub-state S0.1 becomes inactive and target sub-state S0.2 becomes active. When the target state of the composite transition becomes active, the composite transition is completed and the source state of the composite transition becomes inactive. For example, when sub-transition T0.2 is completed, its target state S1 becomes active, the composite transition T0 is completed and the source state S0 becomes inactive.

Figure 18:
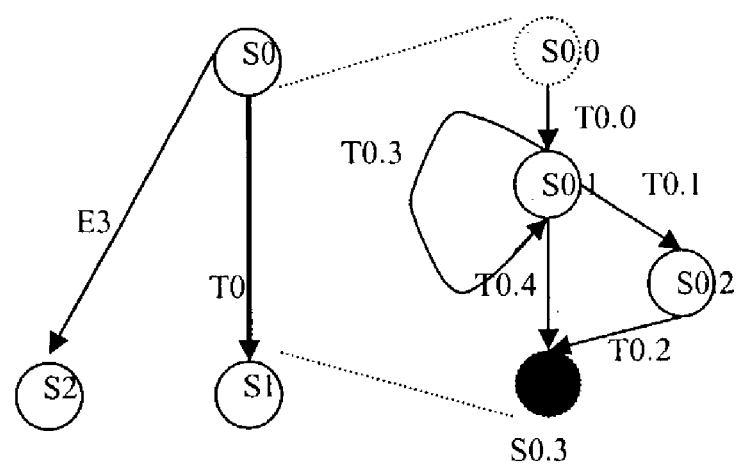
FIG. 18 is a simplified illustrative diagram showing a FSM specification with a Sequential Composite Transition, which is decomposed into a sub-FSM with its pseudo sub-states shown, in accordance with an exemplary method of the present invention.

To help understand the behavior of a Sequential Composite Transition, an initial pseudo sub-state S0.0 and a final pseudo sub-state S0.3 are used to illustrate the exemplary FSM in FIG. 18. These sub-states, the initial pseudo sub-state, the final pseudo sub-state and their associated sub-transitions are connected in a directed graph, where sub-states, the initial pseudo sub-state and the final pseudo sub-state form the vertices, and sub-transitions form the edges of the directed graph. When the source state, such as S0 in this example, of the composite transition T0 becomes active, the initial pseudo sub-state S0.0 becomes active and all sub-transitions, such as T0.0, leading from the initial pseudo sub-state become enabled. Upon receiving an enabled event, its associated sub-transition is completed, the source sub-state of the sub-transition becomes inactive and the target sub-state of the sub-transition becomes active. For example, sub-transition T0.0 has a source sub-state S0.0 and a target sub-state S0.1. When sub-transition T0.0 is completed, the source sub-state S0.0 becomes inactive and target sub-state S0.1 becomes active. When the final pseudo sub-state becomes active, the composite transition is completed. When the composite transition is completed, the source state of the composite transition becomes inactive and the target state of the composite transition becomes active. For example, if T0.2 is completed, the final pseudo sub-state S0.3 becomes active and the composite transition T0 is completed. When T0 is completed, its source state S0 becomes inactive and its target state S1 becomes active.

Figure 19:
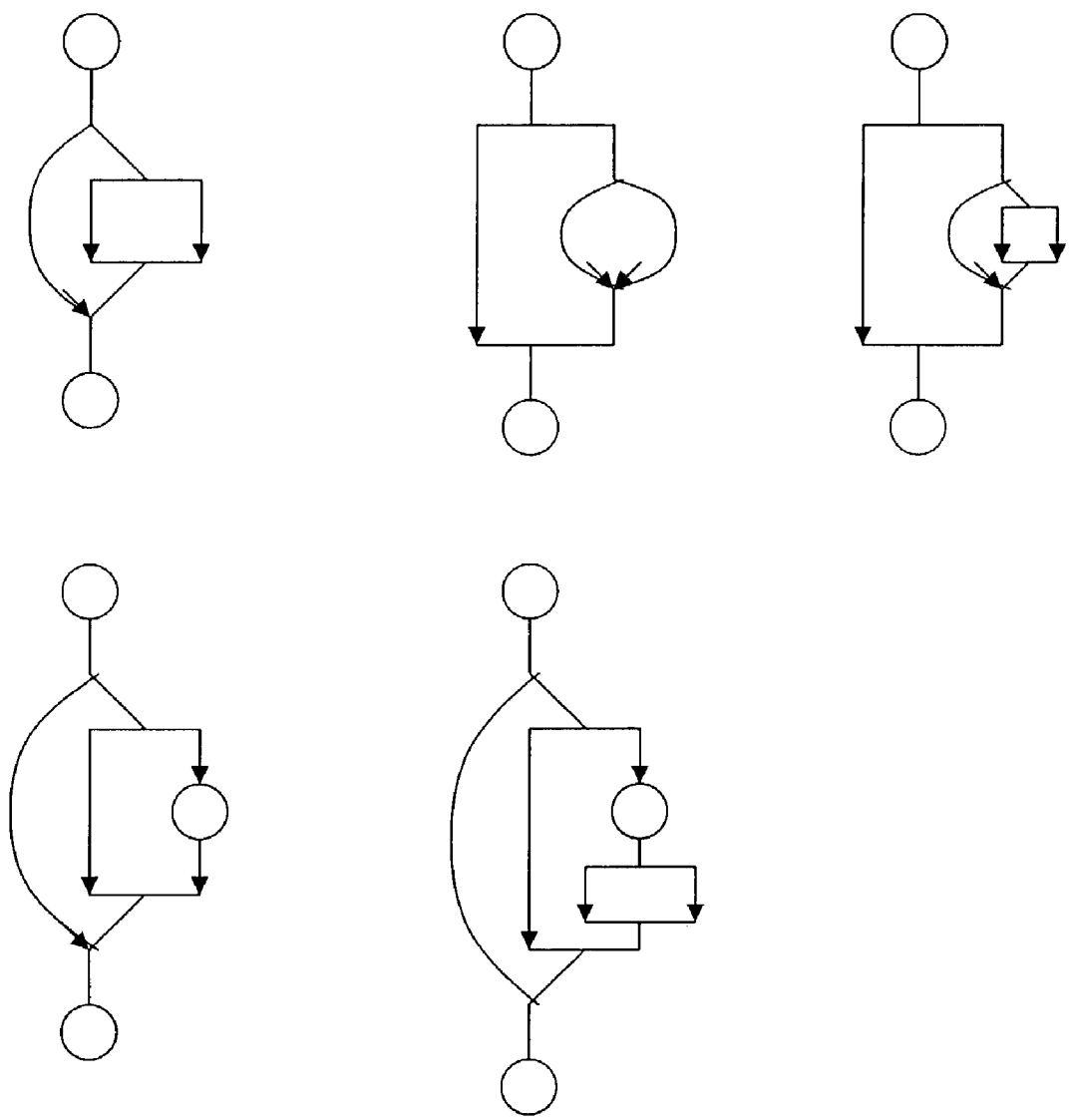
FIG. 19 is a simplified illustrative diagram showing a list of possible FSM specifications with nested Composite Transitions in accordance with an exemplary method of the present invention.

Parallel-AND, Parallel-OR and Sequential Composite Transitions can be combined to form a nested Composite Transition. FIG. 19 shows some examples.

Figure 20:
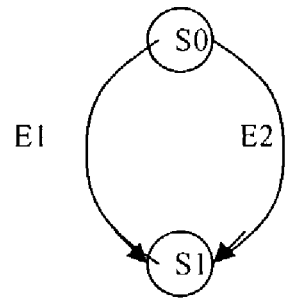
FIG. 20 is a simplified illustrative diagram showing a FSM specification without a Parallel-OR Composite Transition.
Figure 21:
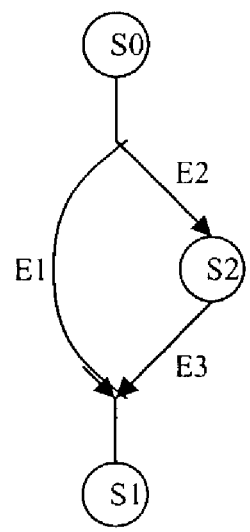
FIG. 21 is a simplified illustrative diagram showing a FSM specification with a Parallel-OR Composite Transition with a Sequential Composite Transition as its sub-transition in accordance with an exemplary method of the present invention.

A Parallel-OR Composite Transition by itself as depicted in FIG. 13 may not seem to be very useful, since its behavior is not different from a state with multiple transitions as depicted in FIG. 20. However, the utility of a Parallel-OR Composite Transition becomes obvious when nested with other Composite Transitions. FIG. 21 shows such an example. When state S0 is active, if event E2 is received, state S2 becomes active. If event E3 is received at this time (when both state S0 and state S2 are active), state S2 becomes inactive and state S1 becomes active. If event E1 is received at this time (when both state S0 and state S2 are active), state S0 becomes inactive and state S1 becomes active.

Figure 22:
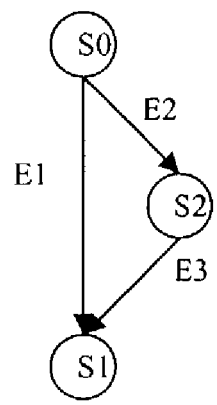
FIG. 22 is a simplified illustrative diagram showing a FSM specification that closely resembles the FSM depicted in FIG. 21.

FIG. 22 depicts a FSM which closely resembles the FSM depicted in FIG. 21, except that the Parallel-OR Composite Transition is not used. The difference is that, in FIG. 22, when state S2 of the FSM is active, event E1 is an invalid event, since state S0 cannot be active at the same time while state S2 is active.

While only one enabled event is needed to complete a Simple Transition, a Composite Transition requires more than one event to complete. Similar to a Simple Transition, each Composite Transition may also have an associated action. The Action associated with a Composite Transition has a special pre-defined event type and it is performed along with the transition completion. In an exemplary method of the present invention, the special pre-defined event type is called "Complex", since the action is typically not triggered by a single event. Since the completion of a Composite Transition may require many of its sub-transitions to complete, more than one action may be performed before a Composite Transition is completed. Since a Composite Transition is completed only when its sub-transitions have completed following conditions described above, as a general rule, the action associated with a Composite Transition is performed after appropriate actions of its sub-transitions are performed.

Figure 23:
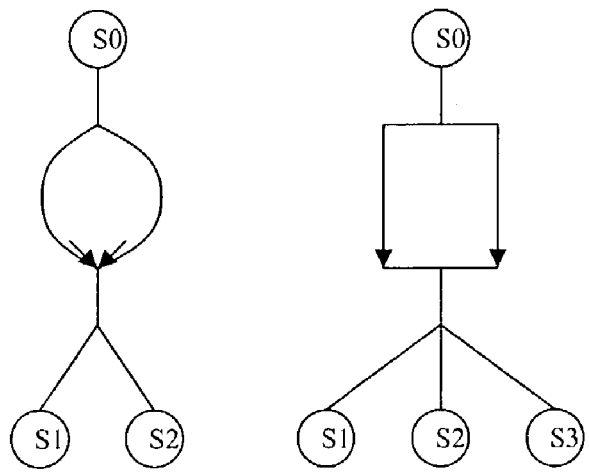
FIG. 23 is a simplified illustrative diagram showing two FSM specifications with a Composite Transition leading to multiple target states in accordance with an exemplary method of the present invention.

All the Composite Transition examples given so far show that a Composite Transition only lead to a single target state. FIG. 23 shows two examples that a Composite Transition may lead to multiple target states (S1, S2, and S3).

The present invention provides a number of benefits. For example, one benefit of the present invention is that various event patterns or nested event patterns of the real world now can be modeled by a Composite Transitions to trigger a state transition.

Another benefit is that the convoluted transitions created by forking and joining transitions, and adding extra synchronization pseudo-states used by a statechart are replaced with highly structured layered Composite States and Composite Transitions. By using a combination of Simple and Composites States, and Simple and Composite Transitions, the readability of a state diagram can be dramatically improved.

Figure 24:
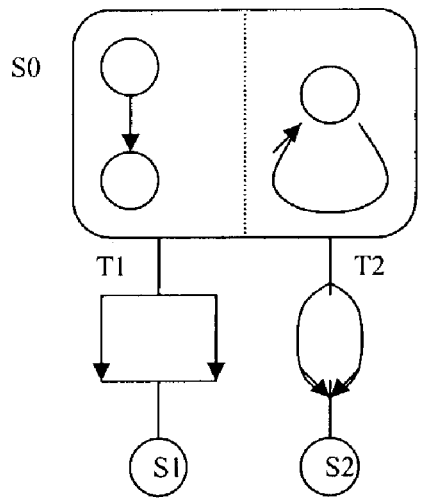
FIG. 24 is a simplified illustrative diagram showing a FSM specification with a Composite State with two Composite Transitions in accordance with an exemplary method of the present invention.

More importantly, Composite Transitions can be used to describe some real world problems, which cannot be described in statechart. For example, FIG. 24 depicts such a FSM, in which Composite State S0 has two Composite Transitions T1 and T2. When Composite Transition T1 completes, state S1 becomes active, and when T2 completes, state S2 becomes active. Statechart is not capable of describing this kind of behavior.

Figure 25:
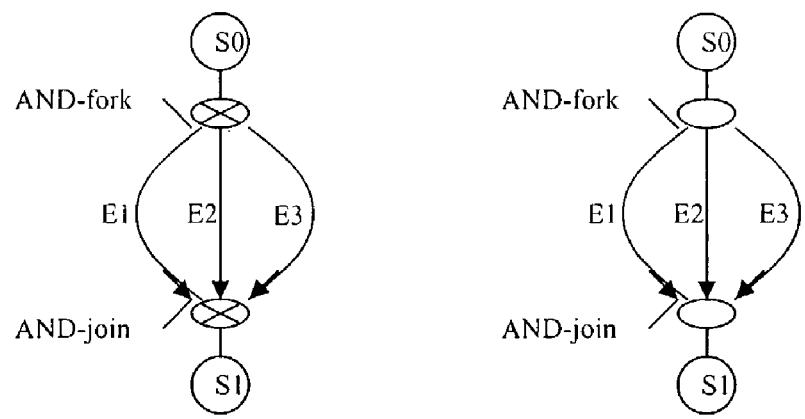
FIG. 25 shows two simplified illustrative diagrams illustrating how a pair of AND-fork and AND-join can also be used to present the Parallel-AND Composite Transition as depicted in FIG. 10.
Figure 26:
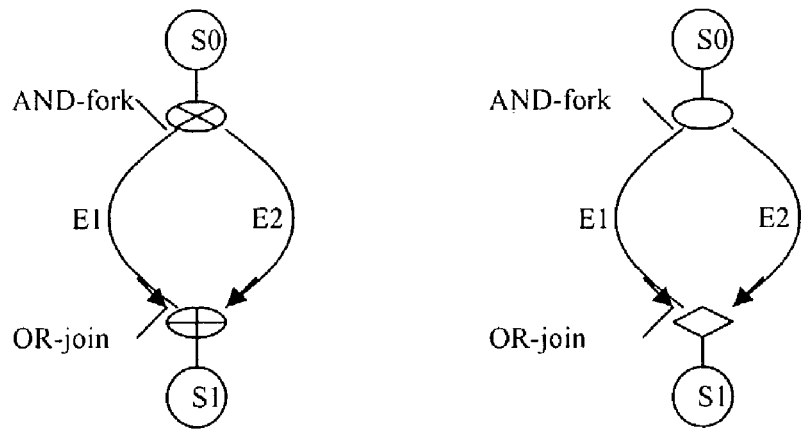
FIG. 26 shows two simplified illustrative diagrams illustrating how a pair of AND-fork and OR-join can also be used to present the Parallel-OR Composite Transition as depicted in FIG. 13.
Figure 27:
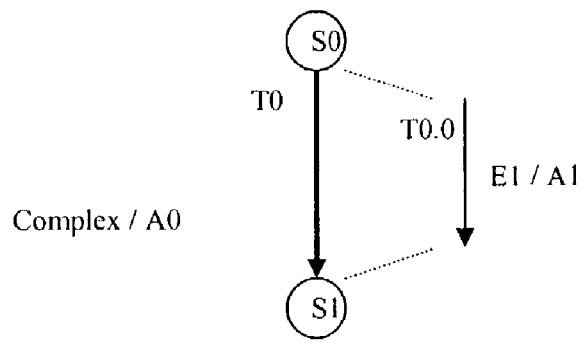
FIG. 27 is a simplified illustrative diagram showing a FSM specification with a Composite Transition decomposed into one sub-transition in accordance with an exemplary method of the present invention.

Although the foregoing description uses one particular graphical presentation to represent Composite Transitions, it should be understood that the concept can also be presented in other ways. For example, FIG. 25 provides two diagrams illustrating how a pair of AND-fork and AND-join can be used to present the Parallel-AND Composite Transition as depicted in FIG. 10. FIG. 26 provides two diagrams illustrating how a pair of AND-fork and OR-join can be used to present the Parallel-OR Composite Transition as depicted in FIG. 13.

Furthermore, the present invention also supports a special case, namely, that a Composite Transition may be decomposed into only one sub-transition. Similar to other Composite Transitions having multiple sub-transitions, the Composite Transition with only one sub-transition is completed after its sub-transition is completed. FIG. 24 depicts that Composite Transition T0 is decomposed into one sub-transition T0.0, and Composite Transition T0 has an associated action A0 with a pre-defined event type "Complex" and sub-transition T0.0 has an associated event E1 and action A1. When event E1 is received, sub-transition T0.0 is completed along with action A1. Then Composite Transition T0 is completed along with action A0.

The benefit of supporting this special case is the following. This special case allows extra flexibility in a FSM design to minimize unnecessary changes. For example, when a design originally requires a Composite Transition with two sub-transitions, one of the sub-transitions can be removed during a subsequent revision. Now this Composite Transition has only one sub-transition. With the support of this special case, the designer is not forced to change the Composite Transition with one sub-transition to a Simple Transition.

Figure 28:
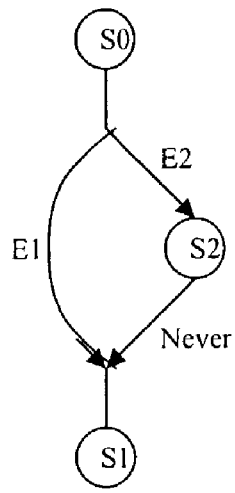
FIG. 28 is a simplified illustrative diagram showing how the special event type "Never" may be used in accordance with an exemplary method of the present invention.

Another special case supported by the present invention is a predefined event type "Never". FIG. 28 depicts one example how this special pre-defined event type may be used. While in state S0, when event E2 happens, sub-state S2 becomes active. Later when event E1 happens, state 1 and sub-state 2 become inactive and state S1 becomes active. Using the event type "Never" ensures that state S1 becomes active only if event E1 happens.

Supporting this special case has a number of benefits. For example, one benefit is that a broader range of real world problems can be solved by the present invention. A second benefit is that the "Never" event can be used to emulate the effect of forking multiple sub-transitions without a joint of all these sub-transitions while keeping the block structure of Composite Transitions. Keeping the block structure makes the FSM diagram easier to read and understand.

The following scenario demonstrates the third limitation of a statechart, and how an exemplary embodiment of the present invention can be applied to overcome this limitation.

With a statechart, an AND-state can be decomposed into multiple parallel, orthogonal or concurrent sub-states (or regions as referred to by UML). An AND-state is called a "Parallel-AND Composite State" in this invention.

Figure 29:
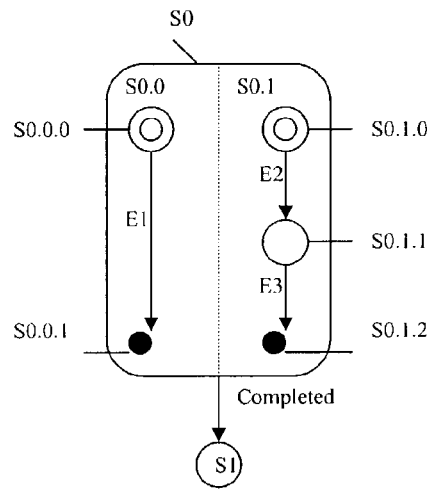
FIG. 29 is a diagram showing a statechart specification with an AND-state (referred to as "Parallel-AND Composite State" herein)

FIG. 29 depicts a FSM with state S0 and state S1. State S0 is a Parallel-AND Composite State, which can be decomposed into two sub-states (S0.0 and S0.1), and sub-state S0.0 is further decomposed into two more sub-states S0.0.0 and S0.0.1, and sub-state S0.1 is further decomposed into three more sub-states S0.1.0, S0.1.1, and S0.1.2. S0.0.0. Sub-states S0.0.0 and S0.1.0 are initial states (shown as double rings). Sub-states S0.0.1 and S0.1.2 are final states (shown as solid circles). Event "Completed" is a special pre-defined event. It is a pre-defined event type, not a user defined event type. When event "Completed" is received, it indicates that state S0 has terminated. Upon receiving event "Completed", state S0 becomes inactive and state S1 becomes active.

When state S0 becomes active, sub-states S0.0 and S0.1 also become active, which in turn cause sub-states S0.0.0 and S0.1.0 become active as well. If event E1 is received, sub-state S0.0.0 becomes inactive and sub-state S0.0.1 becomes active. Since sub-state S0.0.1 is the final state of sub-state S0.0, sub-state S0.0 is considered terminated. If event E2 is received and then event E3 is received, sub-state S0.1.2 becomes active and sub-state S0.1 is considered terminated. The Parallel-AND Composite State (S0) terminated only when all its sub-states (S0.0 and S0.1) have terminated.

However, with some real world applications, a Composite State needs to terminate when any of its sub-states has terminated. Which termination mode (after all sub-states have terminated or after any sub-state terminates) to select depends on the application design and/or logic.

With the present invention, a Parallel-OR Composite State terminates if any of its sub-states has terminated.

Figure 30:
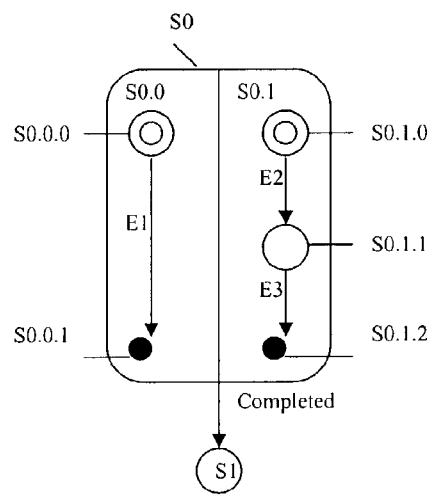
FIG. 30 is a simplified illustrative diagram showing a FSM specification with a Parallel-OR Composite State in accordance with an exemplary method of the present invention.

In FIG. 30, state S0 is a Parallel-OR Composite State. State S0 in FIG. 30 terminates when any of its sub-states S0.0 or S0.1 has terminated. When state S0 terminates, a special pre-defined event "Completed" occurs. A transition may be associated with this special event so that when state S0 terminates, the associated transition can be triggered. In FIG. 30, when state S0 terminates, event "Completed" occurs and triggers the transition associated with it. When that transition is completed, state S0 becomes inactive and state S1 becomes active.

The dotted dividing line of a Parallel-AND Composite State is replaced by a solid divider to represent a Parallel-OR Composite State as shown in FIG. 30. However, it should be understood that other types of graphical representation, indicator or marker can be used to represent the Parallel-OR Composite State.

The benefit of this is that the termination semantics of a Parallel-OR Composite State is supported to solve a broader range of real world problems.

Note that the above descriptions use one particular way to represent creating/terminating child FSMs, Composite Transitions, and Parallel-OR Composite States. However, based on the disclosure and teachings provided herein, it should be apparent to a person of ordinary skill in the art that various diagramming presentations may be used to represent the same mechanisms in accordance with the present invention.

Figure 31:
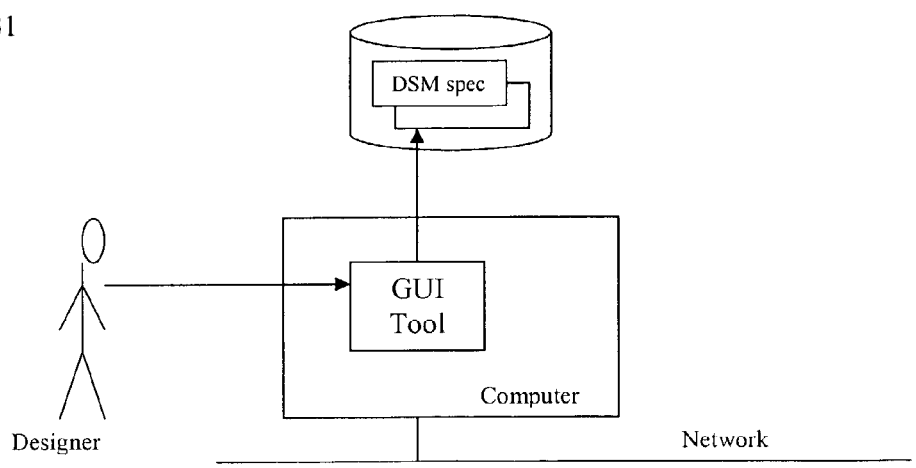
FIG. 31 is a simplified block diagram showing a GUI Tool which can be used to practice an exemplary method of the present invention.

In one exemplary implementation, the exemplary method of the present invention is incorporated in a GUI Tool. All the method steps described above can be followed by a designer using a GUI Tool as depicted in FIG. 31 to develop DSM and FSM specifications based on the present invention. The output of this process is a set of protocol DSM and entity DSM specifications which can then be stored in a storage device for later retrieval to build an application system.

The present invention can be embodied in the form of methods and apparatuses for practicing those methods. The present invention can also be embodied in the form of program code embodied in tangible media, such as floppy diskettes, CD-ROMs, disk drives, or any other machine-readable storage medium. When the program code is loaded into and executed by a machine, such as a computer, the machine becomes an apparatus for practicing the invention. The present invention can also be embodied in the form of program code, which can be transmitted over some transmission medium, such as electrical wiring or cabling, through fiber optics, or via electromagnetic radiation. When the program code is loaded into and executed by a machine, such as a computer, the machine becomes an apparatus for practicing the invention.

Although, as described above, a GUI Tool is used to define protocol and entity DSM and FSM specifications, other tools can also be used. For example, a Computer-Aided Software Engineering (CASE) tool may be used. A CASE tool may support creating and editing DSMs and FSMs as part of an overall object-oriented development methodology incorporating features of this invention.

Another alternative embodiment is that a designer may use a word processor with diagramming capabilities, such as Microsoft Word, to define DSM and FSM specifications.

By following exemplary method in accordance with the present invention, a designer may even use just a pencil and paper to draw DSM and FSM diagrams and write specifications.

Accordingly, it can be seen that DSM and FSM described in accordance with the present invention is a very powerful method and technique to define behavior and protocols of reactive systems. In particular, the present invention extends the prior art, a statechart or a finite state machine related method, in three areas.

One is the integration of a group of related FSMs into a single and powerful entity supporting multiple repeated communication sessions. The second is the support for Composite Transitions to model various parallel event patterns or nested event patterns of the real world, and to dramatically improve the readability of state diagrams. The third is the addition of the Parallel-OR Composite State to support the OR-termination semantics of a Parallel Composite State.

Although the description above contains many specificities, these should not be construed as limiting the scope of the present invention but as merely providing illustrations of some of the presently described embodiments of the present invention. Based on the disclosure and teachings provided herein, it will be appreciated by a person of ordinary skill in the art that various other embodiments and ramifications are possible within the scope of the present invention.

The application of the present invention is very extensive, since most systems solving real world problems can be modeled as reactive systems. For example, in a 3-tier architecture, the database management system can be viewed as a reactive system reacting to input from its upper tier servers. Servers can be viewed as systems reacting to input from its upper tier, namely the presentation tier. The presentation tier can also be viewed as systems reacting to input from human beings. In other words, nearly all computing systems can be modeled by DSM and FSM described in the present invention and benefit from the extended, advanced features as described above.

The present invention can also be used to model highly complex communication protocols. In particular, using a DSM specification, a protocol not only supports one single session, but also supports multiple concurrent nested sessions. In addition, Composite Transitions allow various parallel messages exchanged in a single protocol.

The present invention can also be used to model man-machine interfaces. A human user can deal with multiple things at the same time. To match such a multi-processing capability of a human user, a GUI based application may use DSM to define its interface with human users.

With its highly sophisticated modeling capabilities, it is even possible to model human behavior or an organization behavior with the present invention. The entire business process of an organization can be modeled by several entities with each entity supporting a particular DSM specification.

Since a Transition typically includes an action to perform, the present invention can also be used to decompose a complex action into a series of Sequential, Parallel-AND and Parallel-OR sub-actions. A workflow engine can be built supporting DSMs to carry out various business processes and actions.

Some real world objects, which can have multiple states, such as machinery, customer records, and order entries, can also be modeled with the present invention.

One CASE tool may provide support for performing analysis and verification of DSM and FSM specifications, while another may support reuse of DSM and FSM specifications by providing catalogues and directories of existing DSM and FSM specifications, and searching/matching capabilities.

Some CASE tools may leverage the completeness of the Composite Transition and Composite State features of the present invention to provide layer abstraction or information hiding in the design and drawing of highly complex behavior of reactive systems.

An Integrated Development Environment (IDE) may support the development of software based on the present invention.

Other CASE tools may support simulation of DSM and FSM based systems, or even provide automatic testing by generating test cases from DSM and FSM specifications.

It is understood that the examples and embodiments described herein are for illustrative purposes only and that various modifications or changes in light thereof will be suggested to persons skilled in the art and are to be included within the spirit and purview of this application and scope of the appended claims. It is further understood that various changes in the details, materials, and arrangements of the parts which have been described and illustrated in order to explain the nature of this invention may be made by those skilled in the art without departing from the principle and scope of the invention as expressed in the claims. All publications, patents, and patent applications cited herein are hereby incorporated by reference for all purposes in their entirety.

What is claimed is:

1. A dynamic state machine comprising:
a plurality of finite state machines including a root finite state machine and one or more child finite state machines associated with the root finite state machine, wherein the one or more child finite state machines are dynamically created by the root finite state machine
wherein upon the root finite state machine receiving an enabled event, an action takes place in response to the event, the action including dynamically creating at least one child state machine;
wherein the root finite state machine and the at least one child finite state machine both remain active; and
wherein the root finite state machine and the dynamically created at least one child finite state machine are collectively treated as a single entity.

2. The dynamic state machine of claim 1 wherein each child finite state is capable of dynamically creating its own child finite state machine thereby forming nested finite state machines.

3. The dynamic state machine of claim 1 wherein each of the dynamically created child finite state machines has an associated identifier.

4. The dynamic state machine of claim 1 wherein upon reaching a final state, the dynamically created child finite state machine is terminated.

5. The dynamic state machine of claim 1 wherein the root finite state machine and all dynamically created child finite state machines are collectively identified as a whole by a single identifier.

6. The dynamic state machine of claim 1 wherein the root finite state machine is a statechart.

7. The dynamic state machine of claim 1 wherein at least one of the dynamically created child finite state machines is a statechart.

8. A design tool that allows a user to design specifications based on the dynamic state machine as recited in claim 1.

9. A computing device incorporating the dynamic state machine as recited in claim 1.

10. A development tool that allows a user to build software based on the dynamic state machine as recited in claim 1.

11. A system that supports software based on the dynamic state machine as recited in claim 1.

12. A finite state machine comprising:
at least one composite state;
wherein the at least one composite state further includes a plurality of sub-states;
wherein the plurality of sub-states are related to each other in one of a plurality of relationships;
wherein the plurality of relationships include a parallel-OR relationship; and
wherein under the parallel-OR relationship, all the plurality of sub-states become active when the composite state becomes active and the composite state is terminated when one of the plurality of sub-states is terminated.

13. The finite state machine of claim 12 wherein when one of the plurality of sub-states is terminated, a special pre-defined event occurs.

14. The finite state machine of claim 13 wherein the at least one composite state is associated with the special pre-defined event.

15. The finite state machine of claim 12 wherein the plurality of sub-states are nested.

16. A design tool that allows a user to design specifications based on the finite state machine as recited in claim 12.

17. A computing device incorporating the finite state machine as recited in claim 12.

18. A development tool that allows a user to build software based on the finite state machine as recited in claim 12.

19. A system that supports software based on the finite state machine as recited in claim 12.

\* \* \* \* \*